(12) United States Patent
Hwang et al.

(10) Patent No.: US 12,526,275 B2
(45) Date of Patent: Jan. 13, 2026

(54) SECURE TRANSMITTING AND RECEIVING METHOD FOR REAL TIME DATA

(71) Applicant: GIST(Gwangju Institute of Science and Technology), Gwangju (KR)

(72) Inventors: Euiseok Hwang, Gwangju (KR); Seungwook Yoon, Gwangju (KR)

(73) Assignee: GIST(Gwangju Institute of Science and Technology), Gwangju (KR)

( * ) Notice: Subject to any disclaimer, the term of this patent is extended or adjusted under 35 U.S.C. 154(b) by 185 days.

(21) Appl. No.: 18/342,607

(22) Filed: Jun. 27, 2023

(65) Prior Publication Data

US 2024/0179144 A1     May 30, 2024

(30) Foreign Application Priority Data

Nov. 30, 2022   (KR) .......................... 10-2022-0164851

(51) Int. Cl.
H04L 9/40           (2022.01)
(52) U.S. Cl.
CPC ...... H04L 63/083 (2013.01); *H04L 2463/061* (2013.01)
(58) Field of Classification Search
CPC ................. H04L 63/061; H04L 63/083; H04L 2463/061; H04L 2463/062; H04L 2463/041; H04L 9/3271; H04L 9/0825
See application file for complete search history.

(56) References Cited

U.S. PATENT DOCUMENTS

| | | | | |
|---|---|---|---|---|
| 5,905,821 A | * | 5/1999 | Nonoshita | H04N 1/41 382/233 |
| 7,627,184 B2 | * | 12/2009 | Dei | H04N 21/44209 382/240 |
| 9,081,874 B2 | * | 7/2015 | Kataoka | G06F 16/90344 |
| 9,760,484 B2 | * | 9/2017 | Bi | G06F 9/4408 |
| 10,484,473 B2 | * | 11/2019 | Moorthi | H04L 67/1097 |

* cited by examiner

*Primary Examiner* — Hosuk Song
(74) *Attorney, Agent, or Firm* — Studebaker Brackett PLLC (57) ABSTRACT

The present disclosure relates to a secure transmitting and receiving method that crates a dynamic key on the basis of the features of real-time data, thereby performing authentication operation. A secure transmitting method for real time data according to an embodiment of the present disclosure includes: collecting an n-th datum; compressing the n-th datum; creating and storing an n-th dynamic key in a memory on the basis of a feature extracted in the compressing; creating an n-th security key using an n-m-th dynamic key stored in the memory and transmitting the n-th security key to a server; and transmitting the compressed n-th datum to the server when receiving an authentication success signal from the server.

10 Claims, 6 Drawing Sheets

SECURE TRANSMITTING AND RECEIVING METHOD FOR REAL TIME DATA

CROSS REFERENCE TO RELATED APPLICATION

The present application claims priority to Korean Patent Application No. 10-2022-0164851, filed Nov. 30, 2022, the entire contents of which is incorporated herein for all purposes by this reference.

BACKGROUND OF THE INVENTION

Field of the Invention

The present disclosure relates to a secure transmitting and receiving method that crates a dynamic key on the basis of the feature of real-time data, thereby performing authentication operation.

Description of the Related Art

As the Internet of Things (IOT) is developed, various devices are connected on networks and provide users with various services. Since data that are transmitted and received on such IOT networks include a great number of items of persona information, it is a very important matter to keep data security in management of networks.

Recently, Physical Unclonable Function (PUF) using Challenge Response Pairs (CRP) is applied to IoT networks for data security.

However, such a PUF type is also vulnerable in security because e attackers can estimate responses to challenges by continuously monitoring communication information in the repeated authentication process, and the size of a CRP table has been increased to prevent this problem in the related art; however, this method has limitation in that it just extends the exposure time of security keys and is not a fundamental solution.

SUMMARY OF THE INVENTION

An object of the present disclosure is to create dynamic keys that are determined in accordance with data, which are transmitted and received in the past cycle, at every period of transmission and reception of real-time data, and to use the dynamic keys for transmission and reception of data at the current cycle.

The objectives of the present disclosure are not limited to those described above and other objectives and advantages not stated herein may be understood through the following description and may be clear by embodiments of the present disclosure. Further, it would be easily known that the objectives and advantages of the present disclosure may be achieved by the configurations described in claims and combinations thereof.

In order to achieve the objectives described above, a secure transmitting method for real time data according to an embodiment of the present disclosure includes: collecting an n-th datum; compressing the n-th datum; creating and storing an n-th dynamic key in a memory on the basis of a feature extracted in the compressing; creating an n-th security key using an n-m-th dynamic key stored in the memory and transmitting the n-th security key to a server; and transmitting the compressed n-th datum to the server when receiving an authentication success signal from the server.

In an embodiment, the compressing includes sequentially compressing the n-th datum a predetermined number of times, and the creating of an n-th dynamic key creates the n-th dynamic key on the basis of a feature obtained by compressing the n-th datum by a predetermined number of times.

In an embodiment, the secure transmitting method includes compressing the n-th datum using an auto-encoder.

In an embodiment, the creating of an n-th dynamic key includes creating the n-th dynamic key on the basis of a feature extracted from any one of hidden layers constituting the auto-encoder.

In an embodiment, the any one hidden layer is a final hidden layer of an encoder of the auto-encoder.

In an embodiment, the creating of an n-th security key includes: receiving a challenge and a key creation index m from the server; creating a response key corresponding to the challenge; and creating the n-th security key by combining the response key with the n-m-th dynamic key.

Further, in order to achieve the objectives described above, a secure receiving method for real time data according to an embodiment of the present disclosure includes: transmitting a challenge and a key creation index m to a terminal in response to an authentication request signal from the terminal; receiving an n-th security key from the terminal as response to the challenge; creating an n-m-th dynamic key on the basis of a feature extracted from an n-m-th datum received from the terminal; creating an n-th authentication key using the n-m-th dynamic key; transmitting an authentication success signal to the terminal when the n-th security key and the n-th authentication key are the same; and receiving an n-th datum from the terminal.

In an embodiment, the creating of an n-m-th dynamic key includes: decompressing an n-m-th datum compressed and stored in a database; and creating the n-m-th dynamic key on the basis of a feature extracted in the decompressing.

In an embodiment, the restoring of an n-m-th datum includes restoring the n-m-th datum using an inverse matrix of an auto-encoder of the terminal when the n-m-th datum is compressed by the auto-encoder.

In an embodiment, the creating of an n-th authentication key includes: creating a response key corresponding to the challenge with reference to a database; and creating the n-th authentication key by combining the response key with the n-m-th dynamic key.

The present disclosure creates dynamic keys that is determined in accordance with data transmitted in a past cycle at every periods at which real-time data are transmitted and received, and uses the dynamic keys in authentication for data transmission/reception at the current cycle, so the present disclosure has the advantage that it is possible to figure out a security pattern even if an attacker intercepts a packet on a network and there is not security threat even if a CRP table is exposed in a CRP-based authentication process.

Detailed effects of the present disclosure in addition to the above effects will be described with the following detailed description for accomplishing the present disclosure.

DETAILED DESCRIPTION OF THE INVENTION

The objects, characteristics, and advantages will be described in detail below with reference to the accompanying drawings, so those skilled in the art may easily achieve the spirit of the present disclosure. However, in describing the present disclosure, detailed descriptions of well-known technologies will be omitted so as not to obscure the description of the present disclosure with unnecessary details. Hereinafter, exemplary embodiments of the present invention will be described with reference to accompanying drawings. The same reference numerals are used to indicate the same or similar components in the drawings.

Although terms "first", "second", etc. are used to describe various components in the specification, it should be noted that these components are not limited by the terms. These terms are used to discriminate one component from another component and it is apparent that a first component may be a second component unless specifically stated otherwise.

Further, when a certain configuration is disposed "over (or under)" or "on (beneath)" of a component in the specification, it may mean not only that the certain configuration is disposed on the top (or bottom) of the component, but that another configuration may be interposed between the component and the certain configuration disposed on (or beneath) the component.

Further, when a certain component is "connected", "coupled", or "jointed" to another component in the specification, it should be understood that the components may be directly connected or jointed to each other, but another component may be "interposed" between the components or the components may be "connected", "coupled", or "jointed" through another component.

Further, singular forms that are used in this specification are intended to include plural forms unless the context clearly indicates otherwise. In the specification, terms "configured", "include", or the like should not be construed as necessarily including several components or several steps described herein, in which some of the components or steps may not be included or additional components or steps may be further included.

Further, the term "A and/or B" stated in the specification means that A, B, or A and B unless specifically stated otherwise, and the term "C to D" means that C or more and D or less unless specifically stated otherwise.

The present disclosure relates a to secure transmitting and receiving method that crates a dynamic key on the basis of the feature of real-time data, thereby performing authentication operation. Hereafter, a secure transmission and receiving method for data according to an embodiment of the present disclosure is described in detail with reference to FIGS. 1 to 6.

Figure 1:
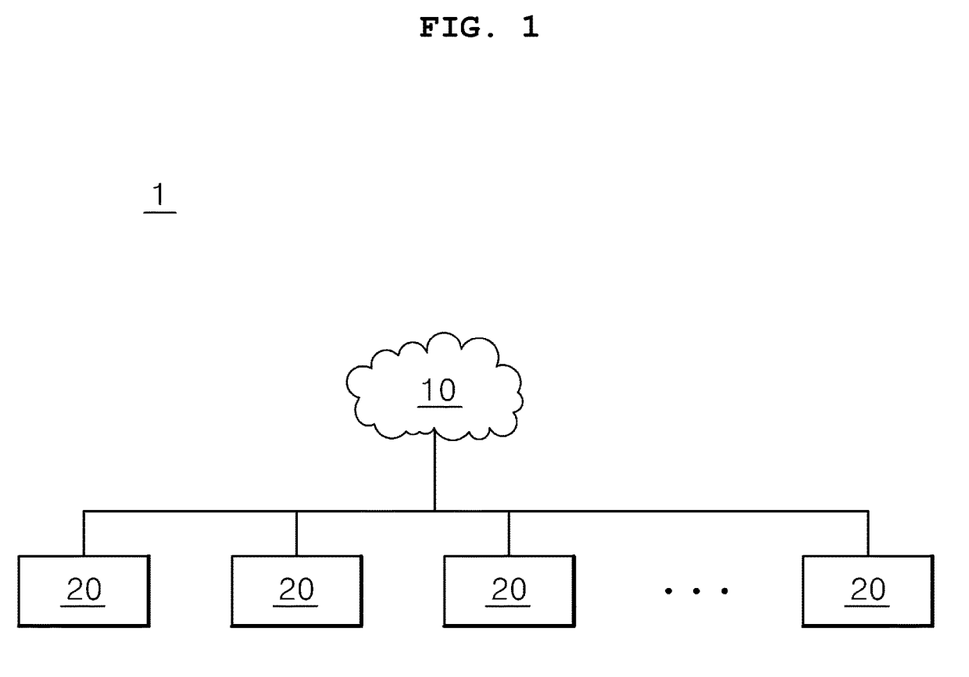
FIG. 1 is a diagram showing a secure transmission and reception system for data according to an embodiment of the present disclosure.

FIG. 1 is a diagram showing a secure transmission and reception system according to an embodiment of the present disclosure.

Figure 2:
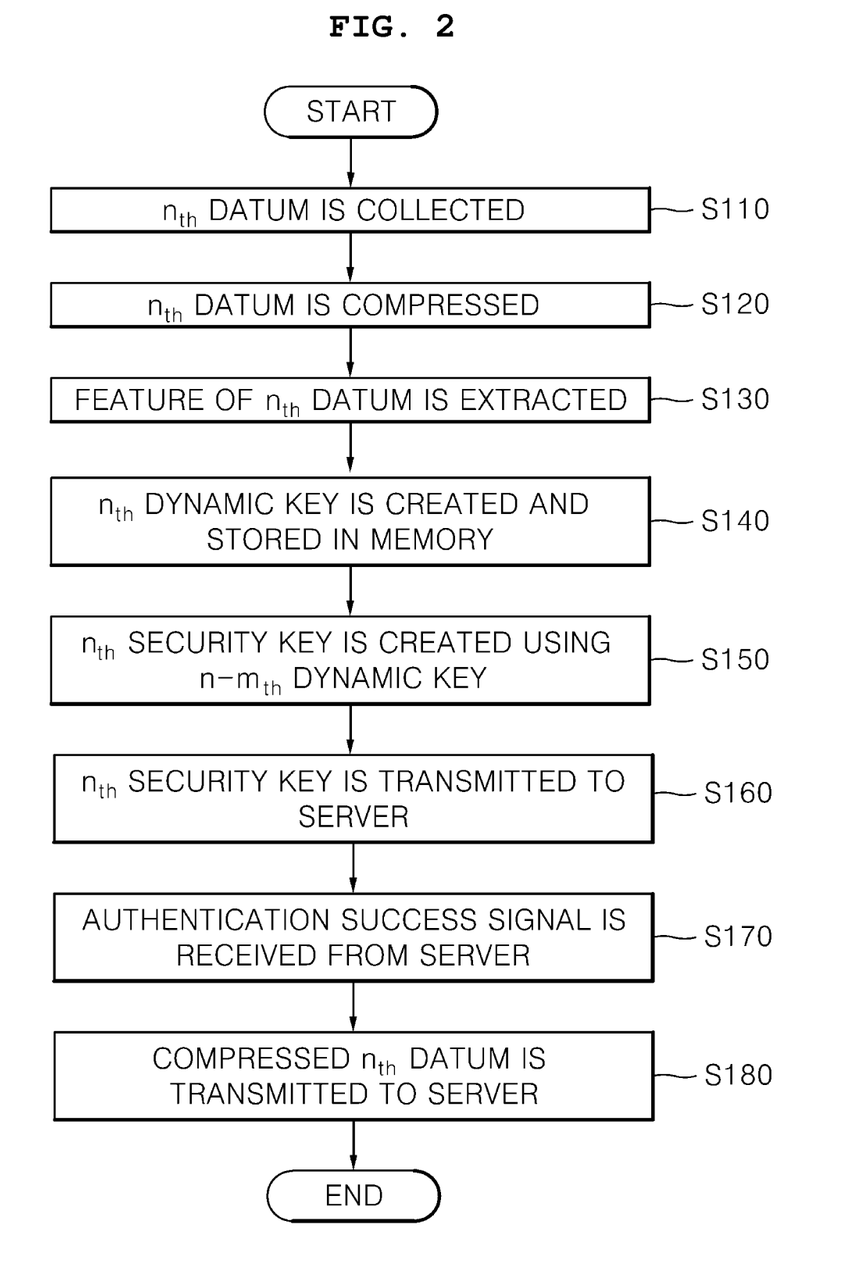
FIGS. 2 and 3 are flowcharts showing method of transmitting and receiving data in security according to an embodiment of the present disclosure, respectively.
Figure 3:
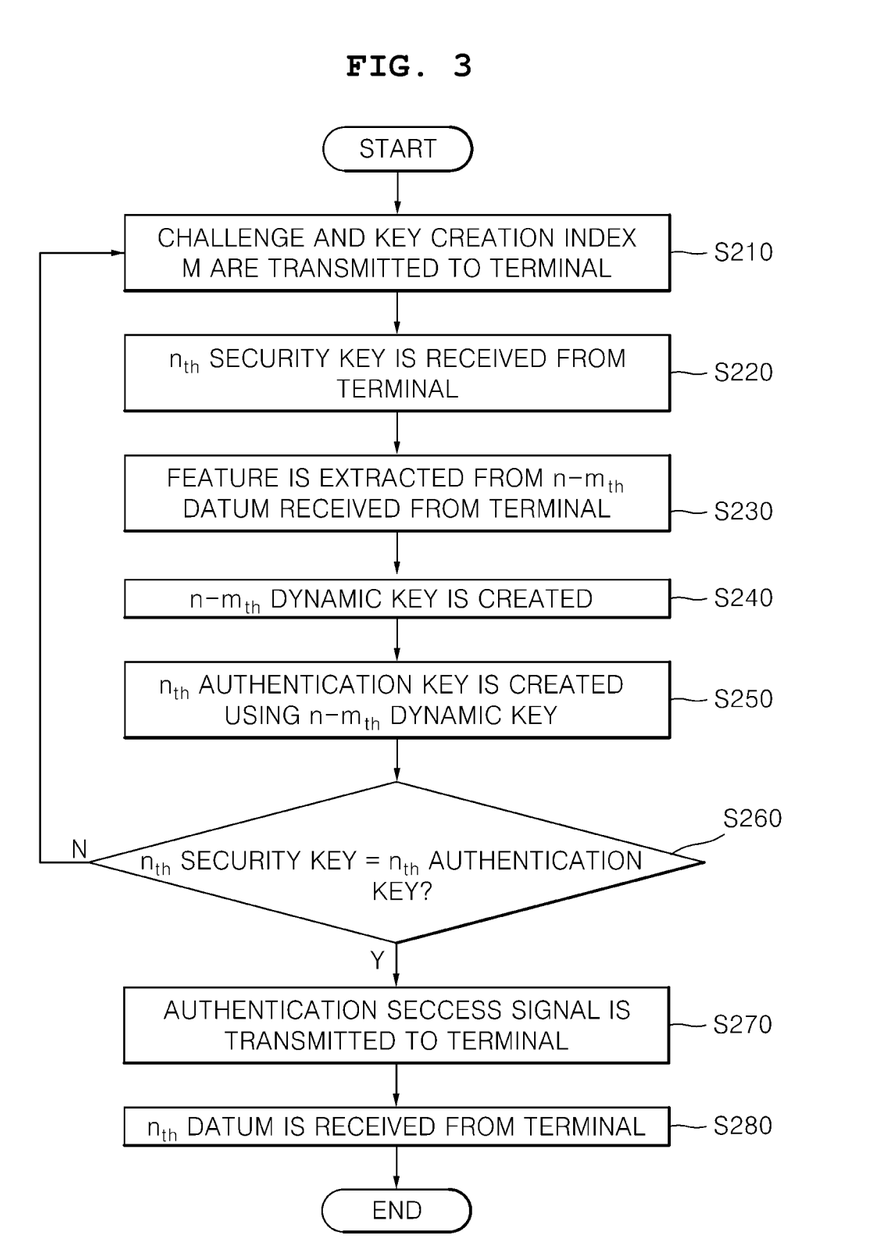
Figure 4:
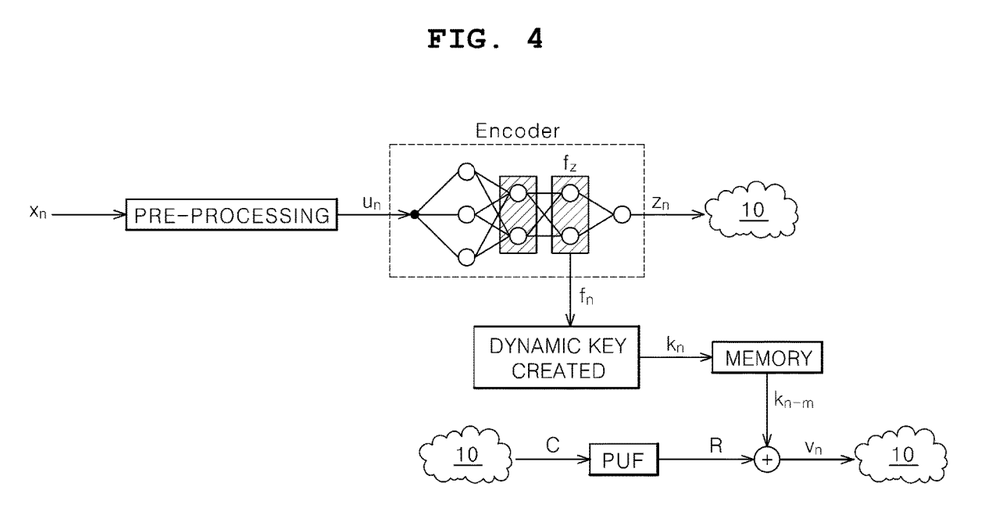
FIGS. 4 and 5 are diagrams schematically showing operation processes of a terminal and a server.
Figure 5:
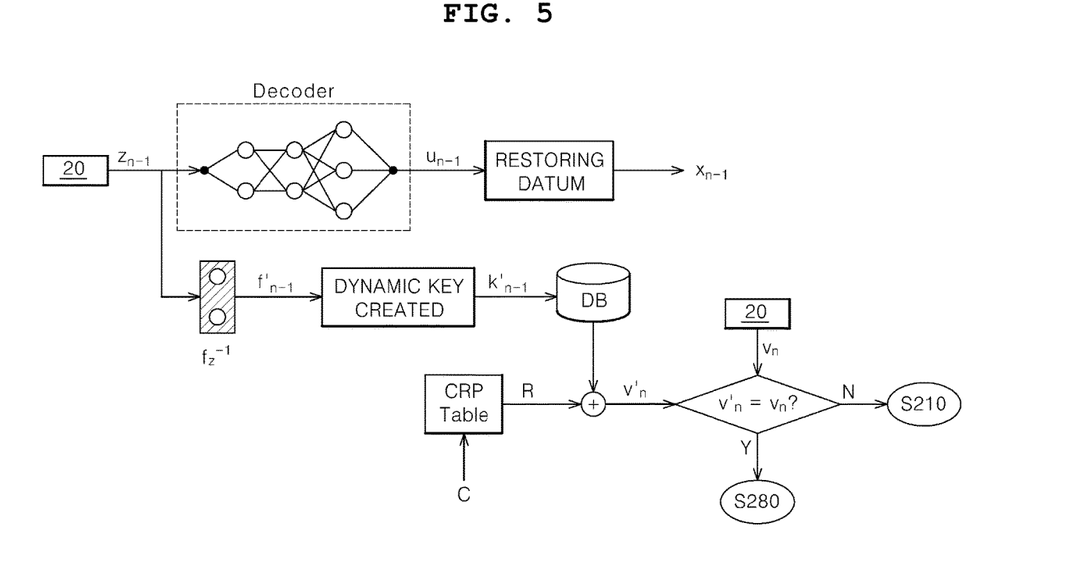
Figure 6:
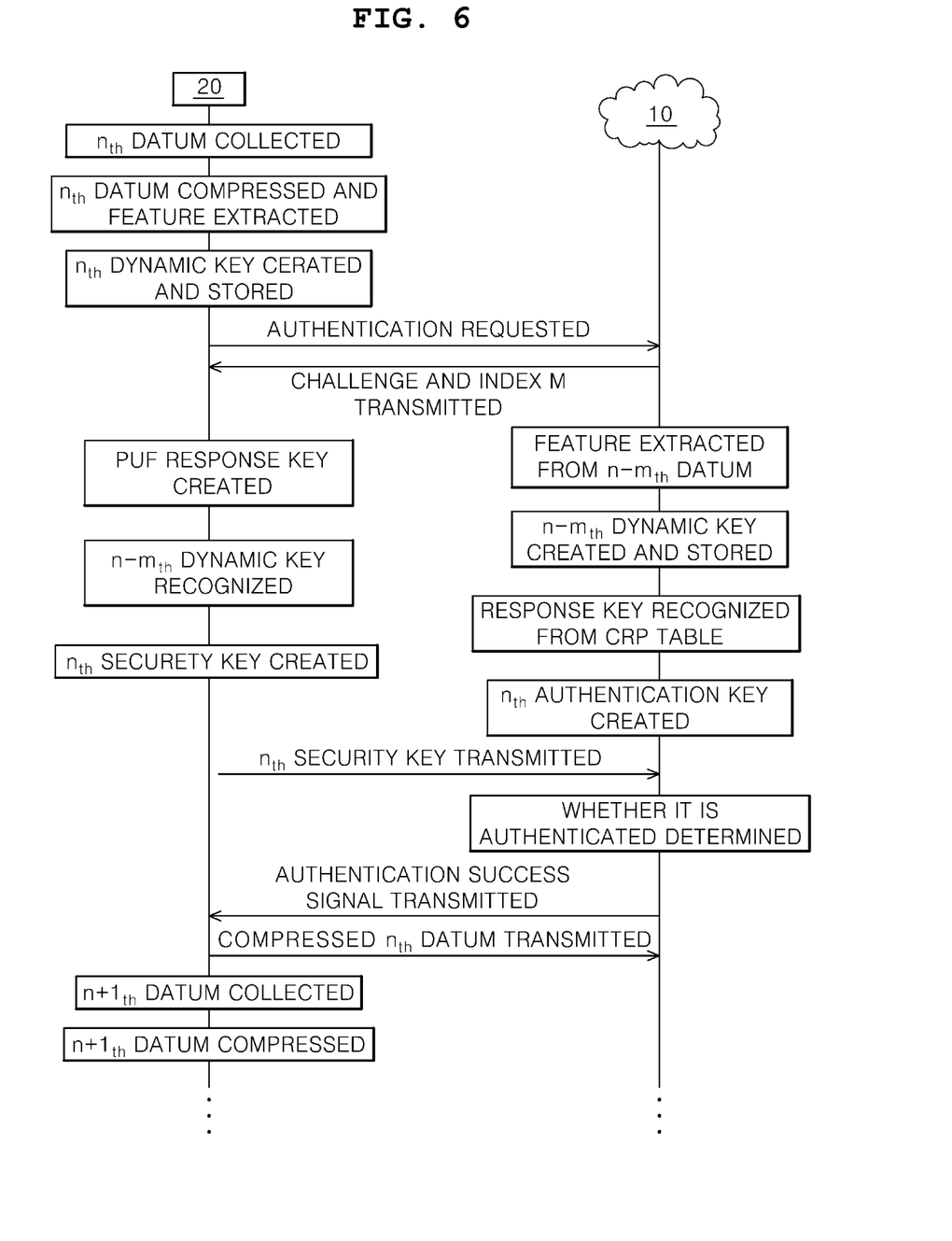
FIG. 6 is a view showing a data transmission and reception process between a terminal and a server.

FIGS. 2 and 3 are flowcharts showing method of transmitting and receiving data in security according to an embodiment of the present disclosure, respectively, FIGS. 4 and 5 are diagrams schematically showing operation processes of a terminal and a server, and FIG. 6 is a view showing a data transmission and reception process between a terminal and a server.

A secure transmitting and receiving system 1 for data of the present disclosure, which is a system that transmits and receives data in real time, may include a server 10 and a plurality of terminals 20. The terminals 20, which are terminals 20 based on Internet of Things (IOT), can collect real-time data that are created in time series. The server 10 may be a server 10 that generally manages real-time data transmitted from the terminals 20 and performs calculation control on the basis of the real-time data.

The server 10 and the terminals 20, in order to the data transmission/reception operation to be described below, may include a processor such as a central processing unit (CPU) and a graphics processing unit (GPU), and, in detail, may include at least one physical element of application specific integrated circuits (ASICs), digital signal processors (DSPs), digital signal processing devices (DSPDs), programmable logic devices (PLDs), field programmable gate arrays (FPGAs), a controller, and micro-controllers.

Referring to FIG. 2, a secure transmitting method for data according to an embodiment of the present disclosure may be performed by each of the terminals 20 and may include: a step of collecting an n-th datum (S110); a step of compressing the n-th datum (S120): a step of extracting a feature of the n-th datum (S130); a step of creating and storing an n-th dynamic key in a memory (S140); a step of creating an n-th security key using an n-m-th dynamic key (S150); a step of transmitting the n-th security key to a server (S160); a step of receiving an authentication success signal from the server (S170); and a step of transmitting the compressed n-th datum to the server.

However, the secure transmitting and receiving method for data shown in FIG. 2 is based on an embodiment, the steps of the present disclosure are not limited to the embodiment shown in FIG. 2, and if necessary, some steps may be added, changed, or removed.

Meanwhile, referring to FIG. 3, a secure receiving method for data according to an embodiment of the present disclosure may be performed by the server 10 and may include: a step of transmitting a challenge and key creating index m to a terminal (S210); a step of receiving an n-th security key from the terminal (S220); a step of extracting a feature from an n-m-th datum received from the terminal (S230); a step of creating an n-m-th dynamic key (S240); a step of creating an n-th authentication key using the n-m-th dynamic key (S250); a step of determining coincidence of the n-th security key and the n-th authentication key (S260); a step of transmitting an authentication success signal to the terminal when the n-th security key and the n-th authentication key are the same (S270); and a step of receiving an n-th datum from the terminal.

Similarly, the secure receiving method for data shown in FIG. 3 is based on an embodiment, the steps of the present disclosure are not limited to the embodiment shown in FIG. 3, and if necessary, some steps may be added, changed, or removed.

First, the operation of the terminal 20 shown in FIG. 2 is described in detail with reference to FIG. 4. The operation of the terminal 20 to be described below is repeatedly performed for every data, and hereafter operation from the point in time at which the terminal 20 collects an n-th datum to the point in time at which the terminal 20 transmits the n-th datum to the server 10 is described in detail for the convenience of description.

Referring to FIG. 4, the terminal 20 can collect an n-th datum $x_n$ (S110) and can pre-process the n-th datum $x_n$. In detail, the terminal can pre-process an n-th datum into a data format required by the server 10, and to this end, it is possible to use techniques such as an event decomposition technique, normalization, and standardization.

The terminal 20 can compress the pre-processed the previously pre-processed n-th datum $u_n$ (S120) and can extract the feature of the n-th feature $f_n$ (S130). This compression process can be performed to reduce the load in an IoT network and can be performed in accordance with the following examples.

In an embodiment, the terminal 20 can sequentially compress the n-th datum $u_n$ a plurality of times. In this case, various techniques that are used in the field can be applied to the compression operation. The terminal 20 can extract a feature $f_n$ compressed a preset number of times during the compression process of a plurality of times. For example, when the terminal compresses the n-th datum $u_n$ three times in total, it can extract a feature $f_n$ compressed two times.

In another embodiment, as shown in FIG. 4, the terminal 20 can compress the n-th datum $u_n$ using an auto-encoder. In detail, the terminal 20 can compress the n-th datum $u_n$ using only an encoder in a pre-trained auto-encoder.

The auto-encoder may include an input layer, an output layer, and a plurality of hidden layer connecting the input layer and the output layer, and the terminal 20 can input the n-th datum $u_n$ to the input layer and then extract a feature $f_n$ from any one hidden layer $f_z$ of the plurality of hidden layers.

Meanwhile, the dimension of the feature $f_n$ extracted from data as it goes through the hidden layers, so, in order to reduce the size of the feature $f_n$ itself (data size) and easily create a dynamic key $k_n$ to be described below, it is preferable that the hidden layer $f_z$ for extracting the feature $f_n$ is the last hidden layer $f_z$ of the encoder of the auto-encoder.

There is an advantage that it is possible to infer the feature $f_n$ of a datum even if an attacker intercepts a finally compressed datum $z_n$ on a network by using a datum in the compression process, that is, a partially compressed datum or a datum extracted from a hidden layer $f_z$ of the auto-encoder as a feature $f_n$.

The terminal 20 can create and store an n-th dynamic key $k_n$ in the memory on the basis of the previously extracted feature $f_n$ (S140). The n-th dynamic key $k_n$ that is stored in the memory is a key $k_n$ that is created on the basis of the n-th datum $x_n$ and can be used in authentication for transmitting data at the next cycle. On the other way, a past dynamic key is used in authentication for transmission of the n-th datum $x_n$.

The terminal 20 can create a dynamic key $k_n$ between 0 and 1 by applying linear quantization, uniform quantization, etc. to the feature $f_n$ in order to determine only the representative value of the feature $f_n$ extracted in the step S130 as the dynamic key $k_n$. Meanwhile, it was exemplified to create a dynamic key $k_n$ through a method of quantizing the feature $f_n$ in the present disclosure, but the n-th dynamic key $k_n$ may be determined as a certain key that may change in accordance with the n-th datum $k_n$.

The terminal 20 can store the n-th dynamic key $k_n$ in the memory and this operation is repeatedly performed for every data, so the first dynamic key $k_1$ to the n-th dynamic key $k_n$ are stored in the memory, and maximally M dynamic keys can be stored. When the memory is full due to repeat of the cycle, the oldest dynamic key can be deleted and a new dynamic key can be stored. Meanwhile, when the memory is a buffer, only a preset number of dynamic keys may be stored in the reverse order from the n-th dynamic key $k_n$ in the memory.

The terminal 20 can create an n-th security key $v_n$ using an n-m-th dynamic key $k_{n-m}$ stored in the memory. In other words, the terminal 20 can create a security key $v_n$ for transmitting the n-th datum $x_n$ using the n-m-th dynamic key $k_{n-m}$ created on the basis of an n-m-th datum $x_{n-m}$. Meanwhile, as described above, when the memory maximally M past dynamic keys, m should be construed as a smaller value than M.

In this case, Physical Unclonable Function (PUF) (hereafter, PUF) having a Challenge Response Pair (CRP) table may be applied to create the security key $v_n$.

In detail, the terminal can transmit an authentication request signal to the server 10 to create the security key $v_n$. The server 10 can transmit a challenge C in the CRP table corresponding to the PUF of the terminal 20 and a key creation index m to the terminal 20 in response to the authentication request signal. The terminal 20 can create a response key R corresponding to the challenge C on the basis of PUF and can create an n-th security key $v_n$ by combining the response key R and the n-m-th dynamic key $k_{n-m}$. In this case, it is apparent that the quantization described above cab be applied to the response key R and/or the security key $v_n$.

The terminal 20 can transmit the n-th security key $v_n$ create in this way to the server 10 (S160). The server 10 can perform authentication operation using the n-th security key $v_n$, which will be described below.

When the server 10 succeeds in authentication, it can transmit an authentication success signal to the terminal 20. The terminal can receive the authentication success signal from the server 10 (S170) and can transmit the n-th datum $z_n$ compressed in the step S120 to the server in response to the authentication success signal.

Hereafter, the operation of the server 10 shown in FIG. 3 is described in detail with reference to FIG. 5. The operation of the server 10 to be described below is repeatedly performed on every data and the operation from the point in time at which the server receives an n–1-th datum to the point in time at which it receives an n-th table when the key creation index m is 1 for the convenience of description.

As described above, the terminal 20 can receive an authentication request signal to the server 10 to transmit data. The server 10 can receive the authentication request signal from the terminal 20 and can transmit a challenge C and a key creation index m (m=1) to the terminal 20 in response to the authentication request signal (S210). In detail, the server 10 can recognize the terminal 10 that has transmitted the authentication request signal and can transmit a challenge C in the CRP table corresponding to the PUF of the terminal 20 to the terminal 20.

The server 10 can receive an n-th security key $v_n$ as response to the challenge from the terminal 20 (S220). In this case, the n-th security key $v_n$ may be, a described above, a combination of a response key R for the challenge C and the n–1-th dynamic key $k_{n-1}$.

The server 10 fundamentally can collect the original $X'_{n-1}$ of the n–1-th datum by decompressing the n–1-th datum $z_{n-1}$ received from the terminal using a decoder of an auto-encoder ($z_{n-1} \rightarrow u'_{n-1}$) and restoring the datum ($u'_{n-1} \rightarrow x'_{n-1}$) through the reverse process of the pre-processing.

In this process, the server 10 can extract the feature of the n–1-th datum $z_{n-1}$ received from the terminal 20 (S230). The feature $f'_{n-1}$ that is extracted from the n–1-th datum $z_{n-1}$ can be used in authentication for reception of the n-th datum $z_n$.

In this case, since the n−1-th datum $z_{n-1}$ received from the terminal is a datum compressed in the step S120, the process of extracting a feature that is performed in the server 10 can be performed in the reverse order of the feature extraction process S130 by the terminal 20.

In detail, the server 10 can extract the n−1-th datum $z_{n-1}$ compressed and stored in a database and can create the feature $f'_{n-1}$ of the n−1-th datum $z_{n-1}$ in the process of decompression. This decompression process can be performed to restore data collected from the terminal 20 and can be performed in accordance with the following examples.

In an embodiment, the server 10 can perform decompression of the n−1-th datum $z_{n-1}$ a plurality of times. The number of times of decompression may be the same as the number of times of compression by the terminal 20 and various techniques that are used in the field can be applied to the decompression operation.

The server 10 can extract a feature decompressed a preset number of times during the decompression process of a plurality of times. In this case, the preset number of times may be the number of times obtained by subtracting the number of times of compression of a datum from the number of times of the entire compression and decompression. For example, when the terminal 20 compresses n−1-th datum $z_{n-1}$ three times in total and extracts a feature $f_n^{-1}$ compressed two times, the server 10 can extract a feature $f'_{n-1}$ by decompressing the n−1-th datum $z_{n-1}$ only one time.

In another example, the server 10 can decompress the n−1-th datum $z_{n-1}$ using an inverse function $f_2^{-1}$ of an auto-encoder. In this case, the auto-encoder may be the same as the auto-encoder used to compress data by the terminal 20. As described above, since the auto-encoder has been trained, parameters (weight and bias) of each of the layers constituting the auto-encoder may be stored in advance in the database in the server 10.

The server 10 determines an inverse function $f_2^{-1}$ of a hidden layer $f_z$ in the encoder of the auto-encoder used to extracting a feature by the terminal 20 on the basis of the parameters stored in the database and applies the n−1-th datum $z_{n-1}$ received from the terminal 20 to the inverse function $f_z^{-1}$, thereby being able to extract a feature $f'_{n-1}$ of the n−1-th datum $z_{n-1}$.

The server 10 can create an n−1-th dynamic key $k'_{n-1}$ on the basis of the extracted feature $f'_{n-1}$ (S240) and can store the n−1-th dynamic key $k'_{n-1}$ in the database. In this case, the n−1-th dynamic key $k'_{n-1}$ is a key created on the basis of the n−1-th datum $z_{n-1}$, and as described below, can be used in authentication for transmission of the n-th datum $z_n$.

The method of creating a dynamic key by means of the server 10 (S240) is the same as the method of creating a dynamic key by means of the terminal 20 (S140), so it is not described in detail herein.

Next, the server 10 can create an n-th authentication key v'n using the n−1-th dynamic key $k'_{n-1}$ (S250). In other words, the server 10 can create an n-th authentication key v'n for receiving the n-th datum $z_n$ using the n−1-th dynamic key $k'_{n-1}$ created on the basis of the n−1-th datum $z_{n-1}$.

The server 10 can recognize the response key R corresponding to the challenge C transmitted to the terminal 20 in the previous step S210 with reference to the database, and can create an n-th authentication key v'n by combining the response key R with the n−1-th dynamic key $k'_{n-1}$.

The method of creating an authentication key by means of the server 10 (S250) is the same as the method of creating a security key by means of the terminal 20 (S150), so it is not described in detail herein.

The server can determine whether the n-th security key $v_n$ received in the step S220 and the n-th authentication key v'n created in the step S250 are the same (S260). When the security key $v_n$ and the authentication key v', are not the same as the result of determination, it is possible to repeat steps from the step S210.

However, when the security key $v_n$ and the authentication key v'n are the same, authentication is successful and an authentication success signal can be transmitted to the terminal 20 (S270). As described in the step S180, the terminal 20 can transmit a compressed n-th datum $z_n$ to the server 10 in response to the authentication success signal and the server 10 can receive the n-th datum $z_n$ from the terminal 20 (S280).

Hereafter, the data transmission/reception process of the terminal 20 and the server 10 of the present disclosure is generally described with reference to FIG. 6.

Referring to FIG. 6, the terminal 20 can collect an n-th datum $x_n$ and can compress the datum to transmit the datum to an IoT network. The terminal 20 can extract a feature $f_n$ of the n-th datum in the process of compressing the datum and can create and store an n-th dynamic key $k_n$ in the memory on the basis of the extracted feature $f_n$.

Next, the terminal 20 can transmit an authentication request signal to the server 10 to transmit the n-th datum $x_n$ and the server 10 can transmit a challenge C and a key creation index m to the terminal 20 in response to the authentication request signal.

The terminal can create a response key R corresponding to the challenge C on the basis of PUF and can recognize and an n−m-th dynamic key $k_{n-m}$ stored in a past cycle with reference to the memory. The terminal 20 can create an n-th security key $v_n$ by combining the response key R and the created n−m-th dynamic key $k_{n-m}$ and transmit the n-th security key $v_n$ to the server 10.

Meanwhile, the server 10 can extract a feature $f'_{n-m}$ from an n−m-th datum $z_{n-m}$ received in a past cycle and can create and store an n−m-th dynamic key $k'_{n-m}$ in the database on the basis of the extracted feature $f'_{n-m}$.

Further, the server 10 can recognize the response key R corresponding to the challenge C transmitted to the terminal 20 with reference to the CRP table stored the database, and can create an n-th authentication key v'n by combining the response key R with the created n−m-th dynamic key $k'_{n-m}$.

Next, the server 10 can determine whether authentication has been succeeded on the basis coincidence of the n-th security key $v_n$ and the n-th authentication key v'n received from the terminal 20, and can transmit an authentication success signal to the terminal when authentication has been succeeded. The terminal 20 can transmit an n-th datum $z_n$ created before to the server 10 in response to the authentication success signal.

When the operation of transmitting the n-th datum $x_n$ is finished, the terminal 20 can collect an n+1-th datum $x_{n+1}$ and the operation described above can be repeatedly performed between the terminal 20 and the server 10.

As described above, the present disclosure creates dynamic keys that is determined in accordance with data transmitted in a past cycle at every periods at which real-time data are transmitted and received, and uses the dynamic keys in authentication for data transmission/reception at the current cycle, so the present disclosure has the advantage that it is possible to figure out a security pattern even if an attacker intercepts a packet on a network and there is not security threat even if a CRP table is exposed in a CRP-based authentication process.

Although the present disclosure was described with reference to the exemplary drawings, it is apparent that the present disclosure is not limited to the embodiments and drawings in the specification and may be modified in various ways by those skilled in the art within the range of the spirit of the present disclosure. Further, even though the operation effects according to the configuration of the present disclosure were not clearly described with the above description of embodiments of the present disclosure, it is apparent that effects that can be expected from the configuration should be also admitted.

What is claimed is:

1. A secure transmitting method for real time data, performed by a plurality of terminals, each of which includes a processor, the secure transmitting method comprising:
   collecting, by each of the plurality of terminals, an n-th datum;
   compressing, by each of the plurality of terminals, the n-th datum;
   creating and storing, by each of the plurality of terminals, an n-th dynamic key in a memory on the basis of a feature extracted in the compressing;
   creating, by each of the plurality of terminals, an n-th security key using an n-m-th dynamic key stored in the memory and transmitting, by each of the plurality of terminals, the n-th security key to a server; and
   transmitting, by each of the plurality of terminals, the compressed n-th datum to the server when receiving an authentication success signal from the server.

2. The secure transmitting method of claim 1, wherein the compressing includes sequentially compressing the n-th datum a predetermined number of times, and
   the creating of an n-th dynamic key creates the n-th dynamic key on the basis of a feature obtained by compressing the n-th datum by a predetermined number of times.

3. The secure transmitting method of claim 1, comprising compressing, by each of the plurality of terminals, the n-th datum using an auto-encoder.

4. The secure transmitting method of claim 3, wherein the creating of an n-th dynamic key includes creating the n-th dynamic key on the basis of a feature extracted from any one of hidden layers constituting the auto-encoder.

5. The secure transmitting method of claim 4, wherein the any one hidden layer is a final hidden layer of an encoder of the auto-encoder.

6. The secure transmitting method of claim 1, wherein the creating of an n-th security key includes:
   receiving a challenge and a key creation index m from the server;
   creating a response key corresponding to the challenge; and
   creating the n-th security key by combining the response key with the n-m-th dynamic key.

7. A secure receiving method for real time data, comprising:
   transmitting a challenge to a terminal in response to an authentication request signal from the terminal;
   receiving an n-th security key from the terminal as response to the challenge;
   creating an n-m-th dynamic key on the basis of a feature extracted from an n-m-th datum received from the terminal;
   creating an n-th authentication key using the n-m-th dynamic key;
   transmitting an authentication success signal to the terminal when the n-th security key and the n-th authentication key are the same; and
   receiving an n-th datum from the terminal.

8. The secure receiving method of claim 7, wherein the creating of an n-m-th dynamic key includes:
   decompressing an n-m-th datum compressed and stored in a database; and
   creating the n-m-th dynamic key on the basis of a feature extracted in the decompressing.

9. The secure receiving method of claim 8, wherein the decompressing of an n-m-th datum includes decompressing the n-m-th datum using an inverse matrix of an auto-encoder of the terminal when the n-m-th datum is compressed by the auto-encoder.

10. The secure receiving method of claim 7, wherein the creating of an n-th authentication key includes:
    creating a response key corresponding to the challenge with reference to a database; and
    creating the n-th authentication key by combining the response key with the n-m-th dynamic key.

* * * * *